Aug. 8, 1967  E. K. PERSSON  3,335,350
MOTOR SPEED CONTROL APPARATUS
Filed June 4, 1964  2 Sheets-Sheet 2
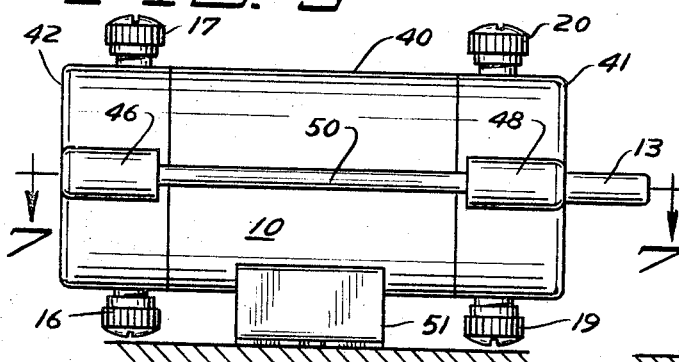
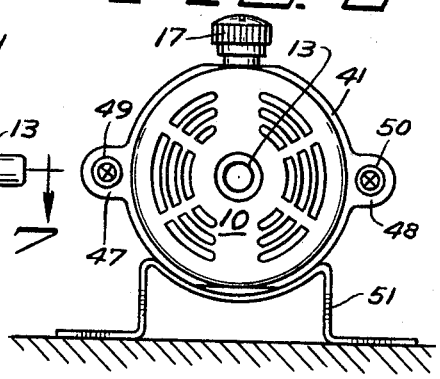
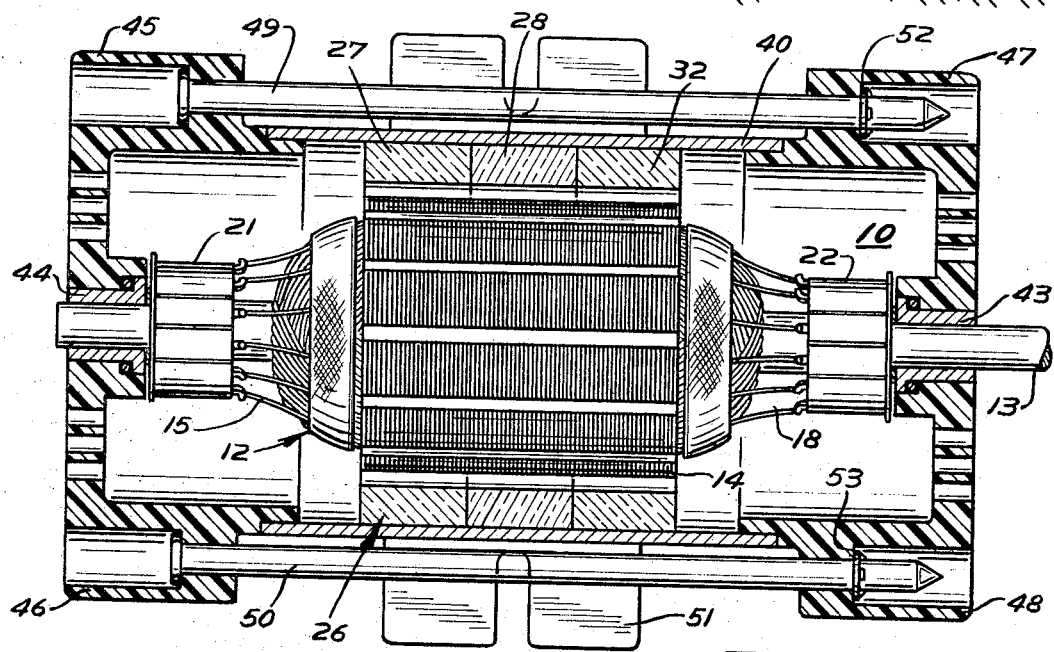
INVENTOR.
ERLAND K. PERSSON
BY
Carlsen, Carlsen & Sturm
ATTORNEYS

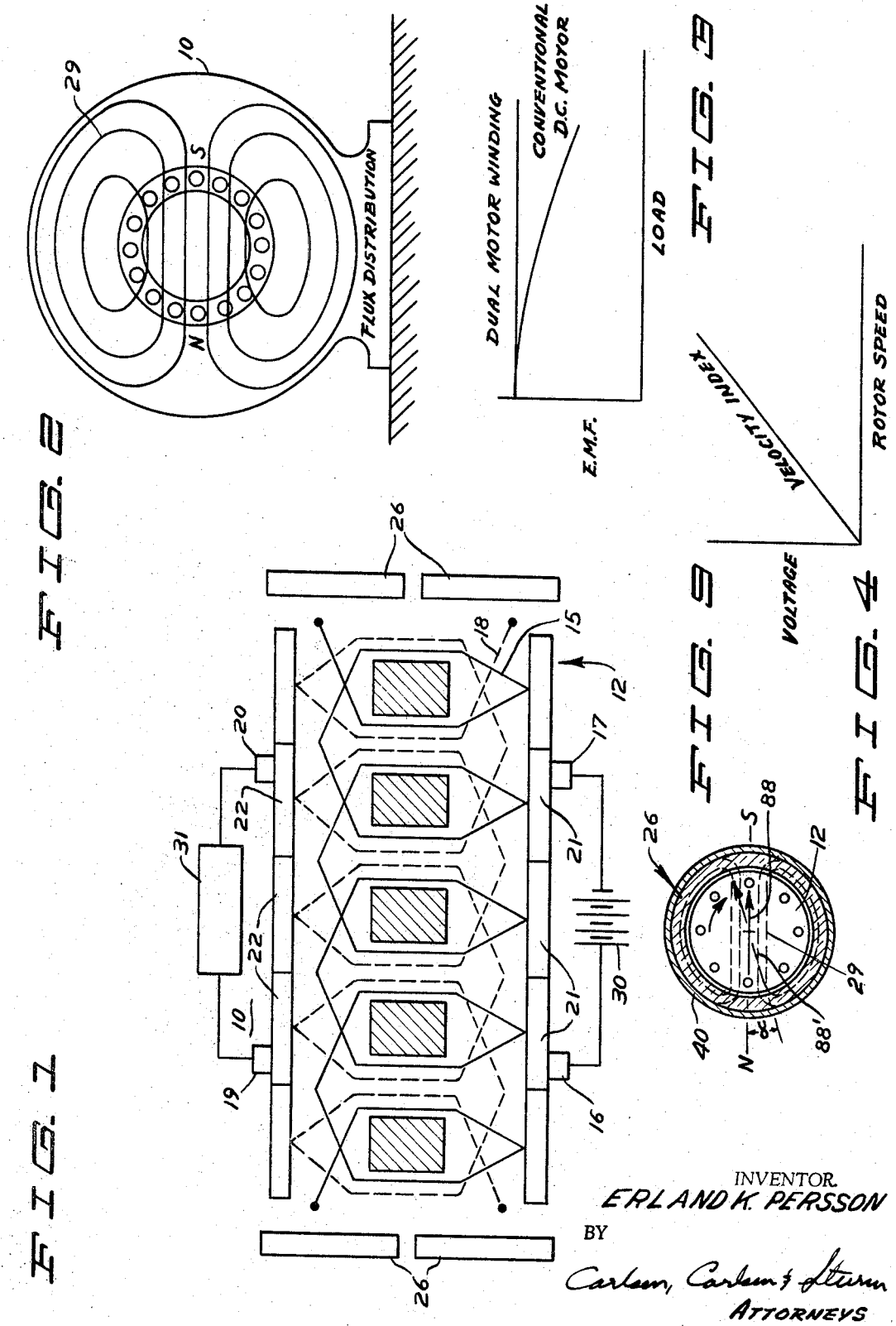

United States Patent Office 3,335,350
Patented Aug. 8, 1967

3,335,350
MOTOR SPEED CONTROL APPARATUS
Erland K. Persson, Minneapolis, Minn., assignor to Electro-Craft Corporation, Hopkins, Minn., a corporation of Minnesota
Filed June 4, 1964, Ser. No. 372,530
7 Claims. (Cl. 318—327)

This in a continuation-in-part of an abandoned earlier filed application in the name of Erland K. Persson, having a Ser. No. 205,911, filed June 28, 1962, for DC Motor-Velocity Index, and assigned to the assignee of this application.

My invention relates generally to improved wide-range control systems for direct current motors and to apparatus and devices for use therein.

As will be set forth in greater detail below, my invention is concerned with apparatus to be energized from a direct current source of power which provides a wide range of speed or velocity of rotational output of a shaft under varying conditions of energization and torque load characteristics.

As one feature of my invention, I have provided a novel and improved combined DC motor and generator in which the motor and generator windings are electrically independent but physically disposed on a rotatable shaft for operation in a magnetic field supplied from a single source of magnetic energy. By suitably characterizing the source of magnetic energy utilized in one embodiment of my invention, it is possible to obtain the desired operational characteristics wherein a voltage, or potential, developed across the generator windings on my combined motor and generator, is linearly proportional to speed of the shaft upon which the coil windings are disposed to substantially eliminate the effects of cross magnetization due to current flow in the motor windings which in turn affects the magnitude and direction of the magnetic field, or flux, present in the motor.

Briefly, my invention is comprised of a shaft that is rotatably journaled in proximity to a source of magnetic energy of relatively high coercivity and low permeability, independent motor and generator windings are suitably disposed on the shaft in operative relationship to said source of magnetic energy, a source of reference potential, a means for comparing the output of the generator winding to the source of reference potential and a current controlling means, responsive to the output of the means for comparing the output of the generator winding and the reference potential, for connecting a source of power in energizing relationship with the motor winding to variably energize the same in accordance with the desired speed or velocity of the shaft.

It is therefore an object of my invention to provide an improved direct current motor speed control system.

It is a further object of my invention to provide an improved direct current motor speed control system which is substantially independent of a load applied to a direct current motor.

A still further object of my invention is to provide an improved motor speed control system having an increased range of speed control while maintaining a useable substantially high torque output of a shaft connected to a load means.

Another object of my invention is to provide an improved motor speed control system which is efficient and economical to manufacture.

Another object of my invention is to provide an improved motor speed control system for a direct current motor which is compact and easy to fabricate and assemble.

A still further object of my invention is to provide an improved combination motor-generator apparatus.

A still further object of my invention is to provide an improved motor-generator apparatus which is economical to construct, efficient in operation and which provides a linear output which is substantially independent of the load placed on the apparatus.

These and other objects of my invention will become apparent from a consideration of the appended specification, claims and drawing, in which—

FIG. 1 is a schematic and diagrammatic representation of a motor-generator embodying the principles of the present invention;

FIG. 2 is a diagrammatic view of a motor-generator indicating the flux distribution emanating from a source of magnetic energy provided therein;

FIG. 3 is a graphical representation and comparison indicating the characteristics of a motor-generator constructed according to the principles of my invention;

FIG. 4 is a graphical representation indicating the linear characteristics of the output of the generator winding on a motor generator constructed according to the principles of my invention;

FIG. 5 is a side elevational view of a motor-generator embodying the principles of my invention;

FIG. 6 is an end view taken from the right end of FIG. 5;

FIG. 7 is a sectional view of the device shown in FIG. 5 taken along section lines 7—7;

FIG. 8 is a schematic diagram of motor speed control apparatus embodying the principles of my invention; and FIG. 9 is a diagrammatic sketch showing the distribution and direction of magnetic flux under static and dynamic conditions of operation of the apparatus shown in FIGS. 5, 6 and 7.

Before proceeding with a description of my improved motor speed control system it is desirable to fully describe the characteristics of my motor-generator device which is incorporated into the improved DC motor speed control system. Referring to FIGS. 1, 2, 5, 6, 7 and 9 of the drawings, like elements have been indicated by like reference characters wherever possible.

From a consideration of the pictorial, diagrammatic and schematic representations of my motor-generator, indicated generally by reference character 10, it may be seen that a housing comprised of cylindrical member 40 and plastic end caps 41 and 42 is adapted to rotatably support a shaft member 13 in bearing members 43 and 44 in end cap members 41 and 42 respectively. Cylindrical body 40 may be formed of suitable metallic material and is provided with a suitable base member 51 for supporting the apparatus in desired relationship with a load means to be driven by shaft 13. A source of magnetic energy, indicated generally by reference character 26, is shown comprised of three rings, 27, 38 and 32 of, for example, isotropic barium ferrite which has been suitably magnetized after the magnets have been positioned and securely mounted within cylinder 10 by the use of suitable mounting means, such as epoxy cement or the like. At each of the open ends of cylinder 40, suitable means (not shown) for keying the same to end caps 41 and 42 are provided to maintain a predetermined desirable relationship corresponding to the position of terminals 16, 17, 19 and 20, each of which are adapted to contain and support suitable brush means adapted to make electrical contact with commutators 21 and 22 provided on shaft 13, as will be discussed below. End caps 41 and 42 are similar in construction and only one will be described in detail. End cap 42 is provided with a pair of brush holder terminals 16 and 17 which provide for electrical connection to brushes contained therein (not shown) for electrical connection to armature 21 on shaft 13 which is positioned in operative relationship thereto when the apparatus is assembled. A pair of radially extending boss portions 45 and 46 are provided with axially extending holes which are positioned to register with like bosses on end cap 41 and are adapted to receive a pair of rod members 49 and 50 that serve to maintain the apparatus in the assembled relationship shown in FIG. 7 by use of the friction retaining means 52 and 53 shown disposed on the right ends thereof. It may thus be seen that the stationary portion of the motor-generator is very simple in construction, is easy to assemble and economical to fabricate from commonly available materials.

It may be noted that the magnetic material indicated generally by reference character 26 is preferably comprised of material which may be magnetized to provide a high coercive force at a very low permeability in the order of 1.1 to provide a substantial contribution to the linearity of operation of the motor-generator and motor speed control system.

Shaft 13 is shown rotatably disposed in bearing members 43 and 44 in end cap members 41 and 42. At the center of shaft 13 a plurality of iron laminations are non-rotatably disposed thereon to provide a slotted armature which extends axially and generally coterminous with the extremities of the source of magnetic energy 26. A pair of commutators 21 and 22 are likewise non-rotatably disposed on shaft 13 for connection to motor and general coil windings 15 and 18 respectively. Motor winding 15 and generator winding 18 may be suitably wound on the iron laminations provided on shaft 13. A bi-filar or independent type of winding technique may be utilized. The size of the wire used for the winding is, of course, dependent upon the expected current load to be carried and it will be appreciated by those skilled in the art that motor winding 15 may be comprised of relatively large sized fire and generator coil winding 18 may be comprised of relatively small sized wire as it does not carry an appreciable amount of current. Due care, of course, must also be observed in locating the coils relative to commutator segments and the brush holders connected to the terminals for the motor and generator windings. This may easily be determined by one skilled in the art of designing and manufacturing direct current electric motors and generators.

In FIG. 1, terminals 19 and 20, which provide a connection to generator coil winding 18, are shown connected to a work piece 31 which may be, for example, a simple voltage responsive tachometer calibrated to indicate the angular velocity of motor-generator 10. It may also be noted that motor-generator 10 is shown suitably energized from a battery 30 connected intermediate motor winding 15 on shaft 13. The connection to a work piece 31, provides merely an indication of the speed of the motor and does not provide for any speed control of motor-generator 10. It does, however, demonstrate the linearity of operation of my motor-generator device and may be used to illustrate the performance under varying load conditions. It may also be noted that the high coercive force present in the magnetic structure of the illustrative embodiment contributes toward the much greater reluctance to a change or shifting of the direction of the magnetic field provided by the magnetic structure and also provides a greater radial pole surface in the order of 140° to 150° which is a substantial increase over the pole surface normally in the range of 100° to 120° found with other forms of magnetic structures.

An alternative source of magnetic energy (not shown) may be utilized in combination with the structure described above. Such an alternative source may be comprised of a pair of complementary positioned and radially disposed axially extending radially shaped members. These segmental members may have a radial dimension of approximately 150° and may be suitably mounted on the inside of member 40 by suitable adhesives or the like.

This provides a relatively constant flux for the motor and generator windings which are operated in the same magnetic field and greatly reduces the tendency for the flux to change direction under the influence of, for example, armature reaction due to the current flowing in the motor windings of the device. This is illustrated in FIG. 3 of the drawing in which the electromotive force present in a winding is shown to decrease with an increase in load whereas operation of the described embodiment of my invention provides a substantially constant electromotive force in the winding with an increase in load. The substantially linear operation of the generator winding of my invention is illustrated in graphical form on FIG. 4. Variation in performance due to constant characteristics such as might be influenced by temperature and the like may be compensated for by methods and apparatus well known to those skilled in the art and are not comprehended as being within the terms of the present invention.

It may thus be seen that the motor-generator device constructed according to the principles of my invention provides a substantially linear variation in the output voltage or potential of a generator winding which is disposed on a rotating armature in combination with a motor winding for operation within the same magnetic field of substantially constant flux direction as provided by a magnetic structure of high coercivity.

An illustrative embodiment of a speed, or velocity control system for a direct current motor constructed according to the principles of my invention is shown schematically and diagrammatically in FIG. 8 of the drawings. FIG. 8 shows generally a pair of terminals 60 and 61 adapted for connection to a source of direct current energy of the polarity indicated. Motor winding 15 is adapted to be energized from a current amplifier which is in turn controlled by a voltage amplifier which is in turn controlled by a comparison circuit that is utilized to compare the output of generator winding 18 with a source of reference potential which may be suitably derived from the source of energy for the apparatus.

Terminal 60 is shown connected to the negative terminal of a source of direct current energy and terminal 61 is shown connected to the positive terminal of a source of energy and conductors 62 and 63 provide a negative and positive potential respectively for application to the several components of the apparatus shown in FIG. 8. In FIG. 8, transistor 84 is shown having its emitter electrode 86 connected to conductor 63 through terminal 17, motor winding 15 and terminal 16 on motor-generator device 10, its collector electrode 87 directly connected to conductor 62 and its base electrode directly connected to emitter 81 on transistor 79.

Collector electrode 82 on transistor 79 is directly connected to conductor 62 and emitter electrode on transistor 79 is connected to a conductor 63 through resistor 84. Transistor 73 is shown having its collector electrodes 76 directly connected to base electrode 80 on transistor 79 and to conductor 62 through resistor 77. Emitter electrode 75 on transistor 73 is connected to conductor 63 through a symmetrical current conducting device 78. Base electrode 74 on transistor 73 is directly connected to collector electrode 70 on transistor 67.

Collector electrode 70 on transistor 67 is connected to conductor 62 through resistor 72 and the emitter electrode on 69 on transistor 67 is directly connected to conductor 63. A source of reference potential is provided across conductors 62 and 63 through a circuit including potentiometer winding 64 and a transducer 66. A wiper 65, operative to suitably coact with potentiometer winding 64, is shown connected to base electrode 68 on transistor 67 through terminal 19, generator winding 18, terminal 20 and resistor 71.

The motor-generator is shown diagrammatically interconnected by driving means 90 and is in turn connected to drive a suitable load means 91 also through driving means 90.

In operation, terminals 60 and 61 are connected to a suitable source of direct current energy of the polarity indicated on the drawing of FIG. 8. Transistors 67, 73, 79 and 87 will become conductive to supply a current to motor winding 15 connected to the emitter electrode of transistor 84. As generator winding 18 develops a potential, or voltage proportional to the rotational velocity or speed of the motor, such potential is supplied in opposition to the potential appearing across the lower portion of potentiometer winding 64 connected across terminals 60 and 61. The potential applied to base 68 of translator 70 through resistor 71 gradually decreases as a balance, or equilibrium condition is reached where the voltage or potential output of generator winding 18 will be slightly less than the potential or voltage appearing across the portion of potentiometer winding 64 intermediate wiper 65 and conductor 63. The power supplied to motor winding 15 through the voltage amplifiers and current amplifiers will be sufficient, with respect to a given load, to maintain the desired speed or velocity of operation of motor generator 10. Should, for example, an increased load torque be applied to the output of motor-generator 10, the resulting tendency for the motor to slow down and decrease the voltage, or potential output of the generator winding 18 will tend to increase the amount of energy supplied to motor winding 15 from terminals 60 and 61 through transistor 84 to maintain the speed at the desired value.

In the embodiment of FIG. 8 and in other embodiments which may occur to those skilled in the art upon becoming familiar with the principles of my invention, a suitable transducer 66, which may change its resistance or impedance in accordance with various physical parameters such as pressure, light, heat and the like may easily be incorporated to control the speed of a motor-generator constructed in accordance with the principles of my invention.

In FIG. 9 a cross sectional representation of the motor-generator described above shows the cylindrical housing 40 and the internally disposed annular source of magnetic energy 26 in relationship to rotor 12 which is concentrically disposed within the confines of source of magnetic energy. A plurality of flux lines are shown in dotted form and are indicated generally by reference character 29. The resultant flux is indicated generally by the reference character 88 applied to the arrow extending from north to south poles of source of magnetic energy 26. The maximum shift in the resultant flux is indicated by the dotted arrow to which reference character 88' has been applied and the angular difference between the resultant fluxes between conditions of no load and maximum load of rotor 12 is indicated by the symbol α.

In devices constructed according to the principles set forth above in connection with my invention, and using barium ferrite material for the source of magnetic energy have a coercive force of approximately 17,000 oersteds and a permeability of 1.1, the angle α due to armature reaction at full load current was observed to be 6.5° which modified the generator output by only 0.7 percent. It may thus be seen that the significant deduction in the resultant direction of flux lines between the apparatus described above and conventional high permeability sources of magnetic energy is significant. Applicant's device clearly provides improved linearity of operation to contribute significantly to a speed control system which is independent of the load applied to a combined direct current motor-generator.

In the speed control system shown in FIG. 8 and described above, it may be desirable to provide suitable means such as a zener diode or the like for regulating the reference potential appearing across potentiometer winding 64 connected in parallel with terminals 60 and 61. This additional feature (not shown) may be desirable where, for example, the load current supplied to the motor tends to reduce the voltage of the source of electrical energy connected to terminals 60 and 61.

This possible source of non-linearity in the operation of a speed control system may also be accomplished in my apparatus through suitable adjustment of the commutator structure for the generator winding. This may be done by radially displacing the generator commutator structure in the direction of rotation whereby the change in reference voltage due to the increase in current may be compensated for by a corresponding change in the output of the generator winding due to armature reaction. This may be illustrated mathematically as follows:

$$\frac{dV_{ref}}{dI} = d\cos\frac{\alpha}{dT}$$

$V_{ref}$ = reference voltage
$I$ = load torque
$T$ = torque

In a motor of the class under consideration, $T = kI$ (where $k$ is a constant). Substituting $I$ for $T$ and differentiating the following relationship is obtained:

$$\frac{dV_{ref}}{dI} = -\sin\alpha\frac{d\alpha}{dI}$$

A value for the angle α may be selected which will provide compensation in the output of the generator winding for the change in reference voltage due to the large current supplied to the motor winding. This results in apparatus in which the motor speed may be substantially independent of the change in reference voltage because of changes in the magnitude of current supplied to the motor winding.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus for maintaining a constant rotational velocity of a shaft under varying torque load conditions imposed by variable load means connected to be driven by said shaft, the combination, comprising:
 (a) a rotatable shaft adapted to be drivingly connected to a variable load means;
 (b) a motor winding having input terminals, disposed on said shaft for rotation therewith;
 (c) a generator winding having output terminals, disposed on said shaft for rotation therewith;
 (d) a single source of magnetic energy disposed in common magnetic energy transferring relationship with said motor winding and said generator winding;
 (e) a source of direct current electrical energy;
 (f) current controlling means having input and output terminals;
 (g) circuit means interconnecting said source of electrical energy, the input terminals on said motor winding and the output terminals on said current controlling means;
 (h) a source of reference potential;
 (i) circuit means, including means for comparing said source of reference potential to the output of said generator winding, connecting the output terminals of said generator winding to the input terminals of said current controlling means;
 (j) said common source of magnetic energy being operative to effect a high degree of linearity in the output of said generator winding with changes in current applied to said motor winding;
 (k) said motor and generator windings being operative to provide a signal at the output terminals of said generator winding that is proportional to a change in rotational velocity of said shaft.

2. The apparatus of claim 1 in which the motor and generator windings are disposed on the shaft in a bifilar relationship.

3. The apparatus of claim 1 in which the single source of magnetic energy is comprised of material exhibiting low permeability.

4. The apparatus of claim 3 in which the single source of magnetic energy is comprised of at least one annular ring disposed concentrically of the shaft.

5. The apparatus of claim 1 in which the means for comparing the source of reference potential to the output of said generator winding includes variable impedance means.

6. The apparatus of claim 5 in which the impedance means is variable in response to changes in a predetermined condition.

7. The apparatus of claim 3 in which the means for comparing the source of reference potential to the output of said generator winding includes condition responsive variable impedance means.

References Cited
UNITED STATES PATENTS

| | | | |
|---|---|---|---|
| 2,427,919 | 9/1947 | Mironowicz | 310—138 X |
| 3,102,964 | 9/1963 | Bennett et al. | 310—154 |
| 3,131,342 | 4/1964 | Wilkerson | 318—327 |
| 3,233,163 | 2/1966 | Matsuo Mishima | 318—327 |
| 3,252,069 | 5/1966 | Ringrose | 318—327 X |
| 3,257,596 | 6/1966 | Wilkins | 318—327 |
| 3,262,039 | 7/1966 | Isamu Ohno | 318—327 |

ORIS L. RADER, *Primary Examiner.*

J. C. BERENZWEIG, J. J. BAKER, *Assistant Examiners.*